United States Patent

Vagis

Patent Number: 5,918,929
Date of Patent: Jul. 6, 1999

[54] DEVICE FOR ATTACHING ACCESSORIES TO THE ROOF OF A MOTOR VEHICLE

[76] Inventor: Brock Vagis, 55332 CR 131, Middlebury, Ind. 46540

[21] Appl. No.: 08/862,029

[22] Filed: May 22, 1997

Related U.S. Application Data

[60] Provisional application No. 60/018,743, May 31, 1996.
[51] Int. Cl.⁶ ............................................ B60J 7/00
[52] U.S. Cl. .......................... 296/210; 296/217; 296/91; 296/180.1; 296/180.2; 296/95.1; 296/180.4
[58] Field of Search ................................. 296/210, 217, 296/91, 180.1, 180.2, 95.1, 180.4

[56] References Cited

U.S. PATENT DOCUMENTS

| | | | |
|---|---|---|---|
| Re. 26,538 | 3/1969 | Bott | 296/91 |
| 3,596,975 | 8/1971 | James | 296/91 |
| 3,799,603 | 3/1974 | Bott | 296/91 |
| 4,179,154 | 12/1979 | Ingram | 296/91 |
| 4,726,618 | 2/1988 | Hansen | 296/91 |
| 4,878,707 | 11/1989 | Meyers | 296/180.1 |
| 4,934,752 | 6/1990 | Bryant | 296/210 |
| 4,978,161 | 12/1990 | Schulze | 296/180.1 |
| 5,013,081 | 5/1991 | Cronce et al. | 296/180.1 |
| 5,249,836 | 10/1993 | Stanesic et al. | 296/91 |
| 5,360,253 | 11/1994 | Sasaki et al. | 296/180.1 |
| 5,435,617 | 7/1995 | Stanesic | 296/91 |

Primary Examiner—Joseph D. Pape
Assistant Examiner—Kiran Patel
Attorney, Agent, or Firm—Baker & Daniels

[57] ABSTRACT

A device for mounting accessories such as roof racks, luggage racks, spoilers or wings to the exterior surface of vehicles such as recreational vehicles, motorhomes, or conversion vans. The device includes a tapered mounting foot having attached thereto a mounting plate which permits generally vertical access to downwardly projecting mounting screws used to attach the accessory mounting plate to the exterior surface of the vehicle. The downwardly projecting screws engage a corresponding set of pre-drilled mounting holes in the vehicle exterior, while a second set of upwardly extending screws secure the mounting plate to the tapered foot of the accessory. Accordingly, the accessory is easy to install and remove, and can be easily retrofitted to existing vehicles without disturbing interior appointments such as upholstery, headliner, or wood trim.

19 Claims, 2 Drawing Sheets

DEVICE FOR ATTACHING ACCESSORIES TO THE ROOF OF A MOTOR VEHICLE

This application claims domestic priority based on an earlier filed Provisional Patent Application, Ser. No. 60/018,743 filed May 31, 1996 now abandoned.

The present invention relates generally to a device for attaching decorative, aerodynamic, or other accessories to the roofs of motor vehicles, such as cars, trucks, conversion vans or other recreational vehicles. The present invention allows the user to more securely install any of the above accessories faster, easier, and more precisely compared to any of the methods currently employed.

BACKGROUND OF THE INVENTION

Many recreational vehicles, especially custom trucks and conversion vans, include decorative and/or aerodynamic accessories such as spoilers, wings, and roof mounted luggage racks. For example, a typical conversion van usually includes a roof-mounted wing or spoiler that is attached on the roof near the rear of the vehicle. These wings or spoilers enhance the overall custom appearance of the vehicle, and also serve a functional purpose, in that they reduce drag and turbulence around the rear of the vehicle when the vehicle is travelling down the road, which greatly improves fuel efficiency.

Most conversion van companies buy stripped vans directly from original equipment manufacturers, and then customize the vehicles by installing lavish custom interiors, distinctive paint highlights or decals, custom wheels and tires, running boards, wings, spoilers, and roof racks. Most of the exterior accessories, such as the wings, spoilers and roof racks, are designed and built by specialty aftermarket supply companies or by the conversion company itself. These exterior accessories are usually constructed of molded fiberglass, and must be painted to match or accentuate the color of the vehicle itself. Because the vehicle itself is already painted, the accessories are preferably painted the desired color before they are installed so that no overspray can damage the factory paint on the vehicle.

At highway speeds, the roof-mounted accessories such as wings, spoilers, and roof racks can be subjected to very high loads and stresses from aerodynamic forces, and unless the accessories are adequately secured they are subject to vibration and/or breakage. Accordingly, these accessories must be screwed or bolted to the roof of the vehicle, usually by screws that are driven upwardly through the roof of the vehicle into the base of the spoiler or wing. Unfortunately, because the vehicles usually include custom upholstered headliners and trim, the roof mounted accessories must be installed very early in the assembly line process before the interior is finished to avoid damage to the custom interior work. However, because the accessories must be painted prior to installation, the paint on the accessories is likely to be nicked, scratched, or otherwise damaged as the vehicle goes through the assembly line. In that event, the damage must be fixed prior to delivery. The vehicle must be masked to prevent overspray from marring the custom finish, and then the exterior accessory is repainted. This install and repair process consumes precious time, labor, and material, and thus undercuts the efficiency of the assembly line.

Furthermore, if the accessory is broken or otherwise damaged during the useful life of the vehicle, the headliner inside the vehicle must be removed in order to gain access to the mounting screws so that the accessory can be removed for repair or replacement. Also, the fact that the headliner must be removed in order to install the accessories precludes most customers from installing their own aftermarket accessories, which hurts the aftermarket accessory industry as a whole.

Another problem with prior art attachment methods is that of stability. On most spoilers and wings, the body of the spoiler extends between two pads or feet, and the feet are attached to the roof of the vehicle. Also, because most modem spoilers are manufactured by a vacuum molding process, the shape of each foot must be straight or slightly tapered so that the spoiler can be extracted from the mold without damaging the foot or other parts of the spoiler. Unfortunately, these straight or tapered feet have a relatively small amount of contact area on the roof, which tends to lessen the overall stability of the finished product and which increases the chances that the accessory will vibrate or oscillate at high speeds.

Accordingly, there is a need for an improved device for attaching roof mounted, aftermarket accessories to motor vehicles that allows the accessories to be installed and removed without removing the headliner in the vehicle, and that can be installed at or near the end of the assembly line so that the accessory will not be subjected to possible damage during the conversion process. There is also a need for an improved device for securing aftermarket accessories to the roofs of motor vehicles that enhances the overall stability of the accessory and that is suitable for use on vacuum formed items.

SUMMARY OF THE INVENTION

The present invention enables the user to quickly, easily, and securely install exterior accessories to the roof of a motor vehicle. The mounting plate design of the present invention allows for a more secure and stable attachment and is suitable for use on vacuum formed accessories having very small and narrow attachment points. Also, because the roof mounted accessory can be installed from outside the vehicle without removing the headliner, all accessories can be installed at the end of the assembly line, which reduces or eliminates the risk of damage to the accessory.

The present invention uses an intermediate mounting plate that is secured to the base or feet of the spoiler or wing by screws or bolts. Preferably, the mounting plate is also secured to the spoiler or wing by two-sided tape or other adhesive to provide for a more positive attachment. The ends of the mounting plate protrude past the edges of the feet on the wing or spoiler so that the wing or spoiler can be screwed or bolted to the roof of the vehicle from above. Again, an auxiliary glue or sealant may be used in order to obtain a more secure bond between the mounting plate and the roof of the vehicle. Additionally, all screws are caulked with a silicone based or a similar pliable sealant to prevent the ingress of water into the vehicle. Thus, the installer does not need to drive screws or bolts upwardly into the accessory from inside the vehicle, thereby eliminating the need to remove or delay the installation of the headliner. Therefore, roof mounted accessories can be installed last in the assembly line process, which completely eliminates the possibility of damage to the accessory.

In the event the accessory needs to be removed, the owner of the vehicle simply needs to remove the main mounting screws and detach the mounting plate from the roof of the vehicle. The entire accessory including the mounting plate can then be lifted off the vehicle for repair, replacement, or permanent removal. The headliner and all interior trim remains in place and is completely unaffected by the removal of the wing or spoiler.

Accordingly, it is an object of this invention to provide a device for securely mounting wings, spoilers, roof racks, and other accessories to the roof of a motor vehicle.

It is another object of this invention to provide a device for mounting wings, spoilers, roof racks, and other accessories to the roof of a motor vehicle that does not require the removal of the headliner inside the vehicle.

Another object of this invention to provide a device for mounting wings, spoilers, roof racks, and other accessories to the roof of a motor vehicle that allows the accessory to be removed, repaired, and/or replaced without removing the headliner.

A further object of this invention is to provide a device for attaching roof-mounted wings, spoilers, and other accessories that eliminates vibration and/or oscillation at high speeds.

These and other objects of the invention will become readily apparent to those skilled in the art upon a reading of the following description.

DETAILED DESCRIPTION OF THE INVENTION

The embodiment described herein is not intended to limit the scope of the invention to the precise form disclosed. Rather, the embodiment has been chosen and described to explain the principles of the invention and its application and practical use to best enable others skilled in the art to follow its teachings.

Figure 1:
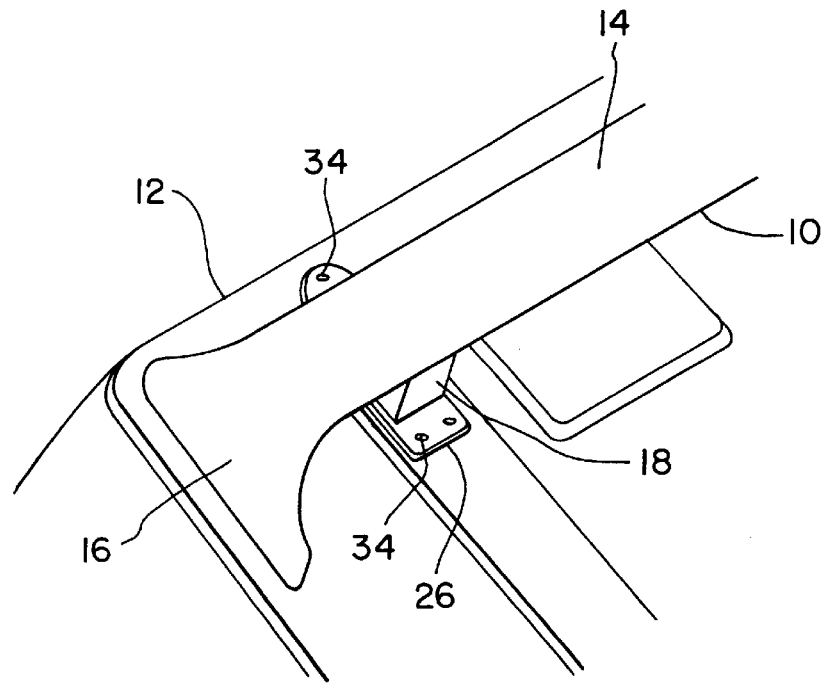
FIG. 1 is fragmentary view in perspective looking down on a roof-mounted wing or spoiler incorporating the features of the present invention shown attached to the rear portion of a motor vehicle.
Figure 3:
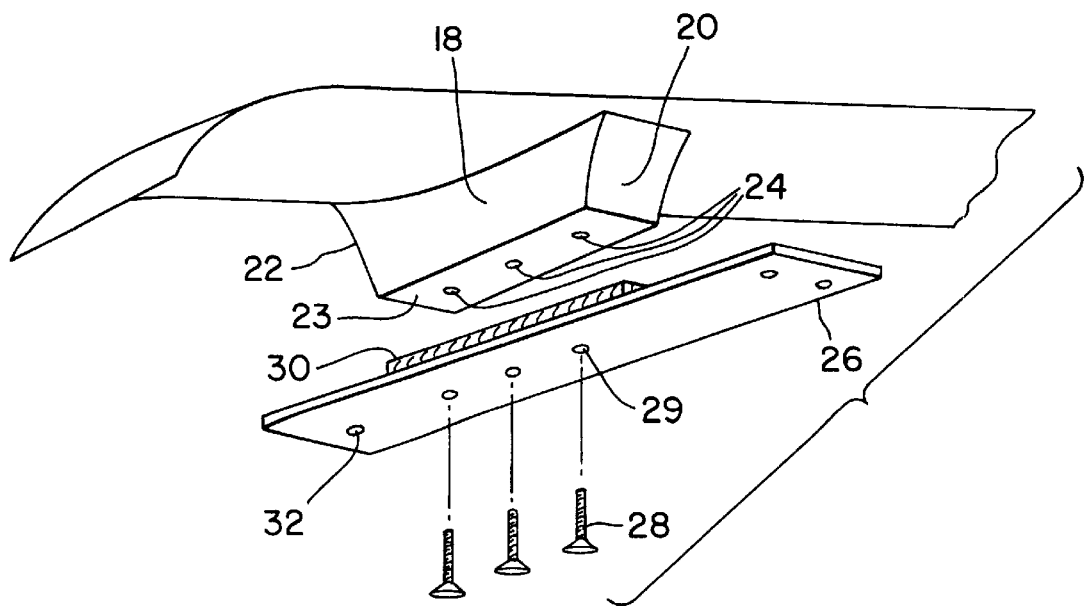
FIG. 3 is a fragmentary view in perspective from below of the spoiler and mounting plate shown in FIGS. 1 and 2 illustrating the attachment of the mounting plate to the foot of a wing or spoiler.
Figure 2:
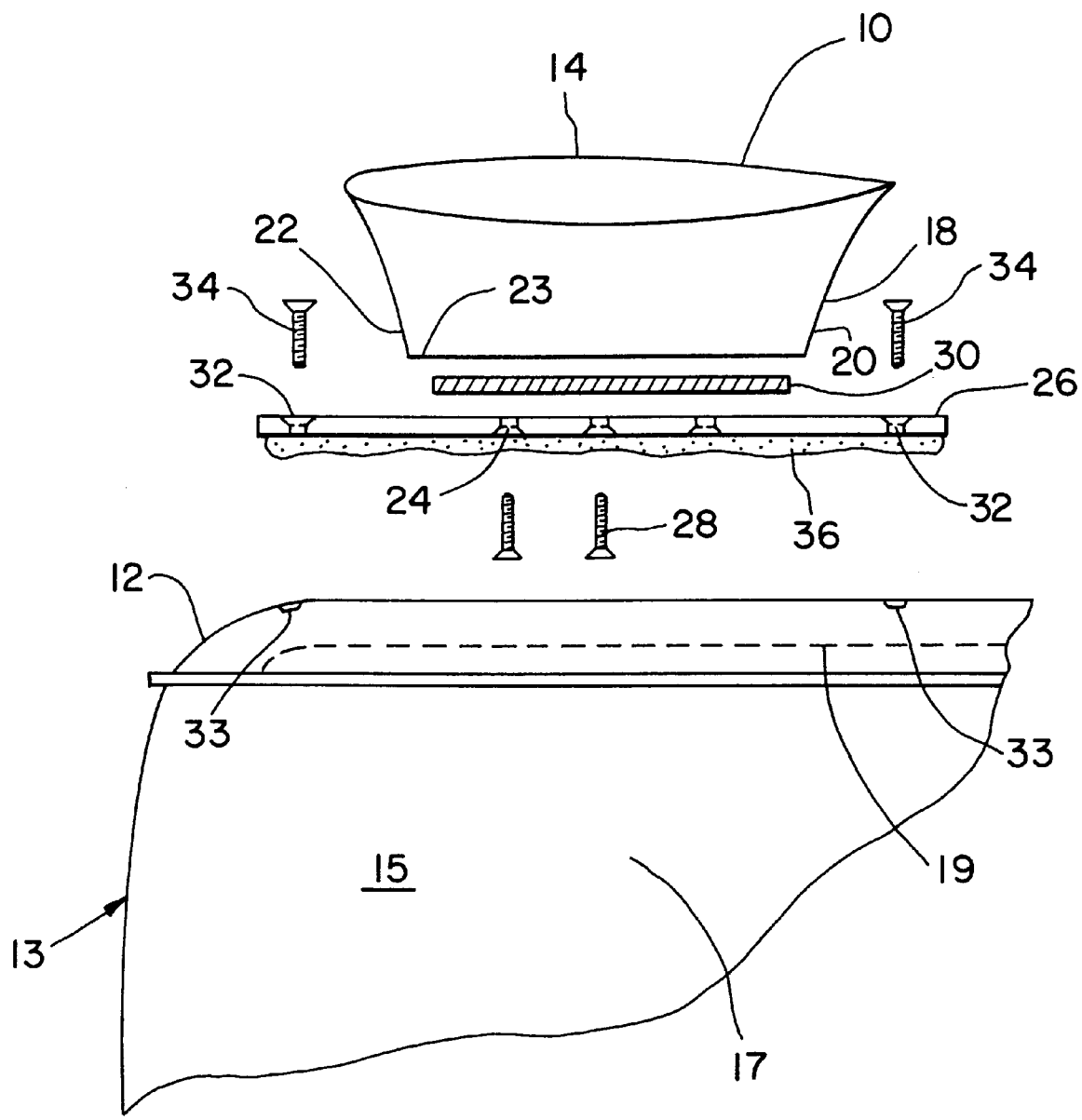
FIG. 2 is an exploded side elevational view of the roof-mounted accessory shown in FIG. 1 illustrating the foot or base of the spoiler and the intermediate mounting plate.

Referring now to the drawings, FIGS. 1 through 3 shows a wing or spoiler 10 attached to the roof 12 of a motor vehicle 13. Motor vehicle 13 includes a plurality of sidewalls 15, which along with roof 12 define an enclosed interior 17. Typically, interior 17 includes decorative trim 19, which normally consists of a leather, vinyl, or cloth headliner, and/or wood trim work. Spoiler 10 is typically constructed of vacuum molded fiberglass, and includes a center wing portion 14, edges 16, and at least one mounting foot 18. Mounting foot 18 of spoiler 10 includes leading edge 20, trailing edge 22, and bottom portion 23 having a plurality of mounting holes 24. Leading edge 20 and trailing edge 22 preferably taper slightly, so that the length of bottom portion 23 is slightly shorter than the length of center wing portion 14. The tapered foot 18 makes it easier to extract the wing 10 from the vacuum mold, and also provides clearance for mounting the wing to the roof as is discussed in greater detail below.

As shown in FIGS. 2 and 3, mounting plate 26 is attached to the bottom portion 23 of mounting foot 18 by a plurality of mounting screws 28 threaded into holes 29. Holes 29 are drilled in alignment with holes 24, and are preferably countersunk so that mounting plate 26 will rest flush on the top of roof 12 as is discussed below. Additionally, adhesive 30, such as 3M brand two-sided tape or a similar commercially available bonding agent, is used to secure mounting plate 26 to bottom portion 23 of mounting foot 18, which provides a stiffer and more secure attachment between mounting plate 26 and foot 18.

Mounting plate 26 includes mounting holes 32 to permit mounting plate 26 and wing 10 to be attached to roof 12 by a plurality of sheet metal screws 34. Holes 33 in the upper surface of roof 12 are drilled to match holes 32 in mounting plate 26. Holes 32 are preferably countersunk so that the heads of screws 34 do not protrude above the top surface of mounting plate 26, which provides a smoother and more pleasing overall appearance. Preferably, an adhesive 36, such as Sikaflex-255FC brand adhesive by Technique Products, is used to secure mounting plate 26 to roof 12, which provides a stiffer and more secure attachment between mounting plate 26 and roof 12. Finally, silicone based caulk or other commercially available sealing agents are applied to screws 34 to prevent water from seeping into the interior of the motor vehicle through the holes in roof 12.

In operation, the installation of wing or spoiler 10 can be accomplished without disturbing the interior appointments of the motor vehicle. Spoiler 10 is painted the desired color, adhesive 30 is applied to either the bottom portion of foot 18 or to the upper surface of mounting plate 26, and then mounting plate 26 is secured to bottom portion 23 by screws 28. Next, adhesive 36 is applied to the underside of mounting plate 26, and spoiler 10 having mounting plate 26 attached is positioned in the desired location, the installer drills holes 33 through roof 12, and secures mounting plate 26 to roof 12 using screws 34 through holes 32 and 33.

It is understood that the above description does not limit the invention to the above-given details, but may be modified within the scope of the following claims.

What is claimed:

1. A device for attaching an accessory to the exterior of a motor vehicle, the exterior enclosing an interior having decorative trim, the accessory including a vehicle engaging surface, the device comprising:

a mounting plate having a pair of opposed mounting surfaces;

first means for securing one of said mounting surfaces to the accessory vehicle engaging surface;

said first means including a set of mounting holes in said mounting plate in alignment with a corresponding set of mounting holes in the accessory vehicle engaging surface;

said first means including fasteners projecting outwardly from said other mounting surface towards the vehicle accessory mounting surface, said mounting holes being countersunk, thereby permitting said other mounting plate surface to rest flush on the vehicle exterior; and second means for securing the other of said mounting surfaces to the vehicle exterior, said second means being inwardly projecting from the vehicle exterior towards the vehicle interior, said second means being releasable to permit the accessory to be removed from the vehicle exterior without disturbing the vehicle interior trim.

2. The device as claimed in claim 1, wherein said second means includes a set of mounting holes in said mounting plate in alignment with a corresponding set of mounting holes in the vehicle exterior.

3. The device as claimed in claim 2, wherein said second means includes a fastener disposed through each of said sets of holes.

4. The device as claimed in claim 3, wherein said second means includes an adhesive.

5. The device as claimed in claim 4, wherein said adhesive is Sikaflex-255FC brand adhesive.

6. The device as claimed in claim 1, wherein each of said accessory vehicle engaging surface and said one mounting surface includes a first set of mutually engaging surfaces having a first surface area, and further wherein said other mounting surface and the vehicle exterior include a second set of mutually engaging surfaces having a second surface area.

7. The device as claimed in claim 6, wherein said second surface area is larger than said first surface area.

8. The device as claimed in claim 1, wherein the accessory includes a mounting foot, said mounting foot tapering with distance from the accessory to said accessory vehicle engaging surface.

9. The device as claimed in claim 1, wherein said second mounting means includes access means for providing substantially vertical access to said second mounting means to thereby permit said second mounting means to be engaged or disengaged along an axis generally perpendicular to the plane of the vehicle exterior.

10. The device as claimed in claim 3, wherein said mounting plate holes are countersunk, thereby permitting said fasteners to form a substantially continuous flat plane with one of said mounting plate surfaces.

11. The device as claimed in claim 1, wherein said first mounting means includes an adhesive.

12. A device for attaching a vacuum formed accessory to the exterior of a motor vehicle, the exterior enclosing an interior having decorative trim, the accessory including a vehicle engaging surface, the device comprising:

a mounting plate having a pair of opposed mounting surfaces;

first means for securing one of said mounting surfaces to the accessory vehicle engaging surface, said accessory vehicle engaging surface being connected to the accessory by a mounting foot, said mounting foot tapering with distance from said accessory to said accessory vehicle engaging surface; and second means for securing the other of said mounting surfaces to the vehicle exterior, said second means including a set of mounting holes in said mounting plate in alignment with a corresponding set of mounting holes in the vehicle exterior, said second means including fasteners inwardly projecting from the vehicle exterior towards the vehicle interior;

each of said accessory vehicle engaging surface and said one mounting surface includes a first set of mutually engaging surfaces having a first surface area, and further wherein said other mounting surface and the vehicle exterior include a second set of mutually engaging surfaces having a second surface area, said second surface area being larger than said first surface area, said mounting foot and said mounting plate cooperating to define access means for providing access to said second mounting means along a line generally perpendicular to the plane of the vehicle exterior, said first mounting means including fasteners projecting outwardly from said other mounting surface towards the vehicle accessory mounting surface, thereby permitting said other mounting plate surface to rest flush on the vehicle exterior, said second means being releasable to permit the accessory to be removed from the vehicle exterior without disturbing the vehicle interior trim.

13. An accessory for attachment to the exterior of a motor vehicle, the vehicle exterior enclosing an interior having decorative trim, the accessory comprising:

a spoiler having an elongated body formed as a single piece of fiberglass, said body including a blade portion extending along the width of the vehicle exterior surface, said body having at least one mounting leg which defines a foot with a bottom surface for attaching said accessory to the vehicle exterior;

a mounting plate having first and second surfaces, said mounting plate having an exterior perimeter which extends beyond said foot bottom surface;

a first fastener engaging said mounting plate first surface and said foot bottom surface;

a second fastener engaging said mounting plate second surface and the vehicle exterior, whereby said accessory can be installed on the vehicle exterior without disturbing the vehicle interior trim.

14. The accessory as claimed in claim 13, wherein said first surface has a set of mounting holes in alignment with a corresponding set of mounting holes in said foot bottom surface, said mounting holes are countersunk, thereby permitting said second surface to rest flush on the vehicle exterior.

15. The accessory as claimed in claim 13, wherein said second surface has a set of mounting holes in alignment with a corresponding set of mounting holes in the vehicle exterior, said mounting holes are countersunk, thereby permitting said second fastener to form a substantially continuous flat plane with said mounting plate.

16. The accessory as claimed in claim 14, wherein said first surface includes an adhesive.

17. The accessory as claimed in claim 15, wherein said second surface includes an adhesive.

18. The accessory as claimed in claim 14, further comprising a sealing agent disposed proximate said mounting holes.

19. The accessory as claimed in claim 15, further comprising a sealing agent disposed proximate said mounting holes.

* * * * *